United States Patent
Leeson et al.

(10) Patent No.: US 12,422,625 B2
(45) Date of Patent: Sep. 23, 2025

(54) OPTICAL FIBER CONNECTOR FOR MINIMIZING SIGNAL TRANSMISSION LOSSES

(71) Applicant: PPC BROADBAND FIBER LTD., Woodbridge (GB)

(72) Inventors: Kim Leeson, Ipswich (GB); Shaun Trezise, Aldeburgh (GB)

(73) Assignee: PPC BROADBAND FIBER LTD., Woodbridge (GB)

( * ) Notice: Subject to any disclaimer, the term of this patent is extended or adjusted under 35 U.S.C. 154(b) by 7 days.

(21) Appl. No.: 17/891,997

(22) Filed: Aug. 19, 2022

(65) Prior Publication Data

US 2023/0055015 A1 Feb. 23, 2023

Related U.S. Application Data

(60) Provisional application No. 63/234,968, filed on Aug. 19, 2021.

(51) Int. Cl.
*G02B 6/38* (2006.01)

(52) U.S. Cl.
CPC ......... *G02B 6/3821* (2013.01); *G02B 6/3825* (2013.01); *G02B 6/3834* (2013.01); *G02B 6/3893* (2013.01); *G02B 6/3897* (2013.01)

(58) Field of Classification Search
None
See application file for complete search history.

(56) References Cited

U.S. PATENT DOCUMENTS

| 9,766,413 | B2 | 9/2017 | Zimmel et al. | |
|---|---|---|---|---|
| 2007/0292084 | A1* | 12/2007 | Gurreri | G02B 6/3869 385/78 |
| 2010/0254663 | A1* | 10/2010 | Hopkins | G02B 6/38875 385/78 |

FOREIGN PATENT DOCUMENTS

| CN | 105283787 | B | 5/2018 |
|---|---|---|---|
| CN | 108614327 | B | 8/2019 |
| CN | 110609359 | A | 12/2019 |
| EP | 2920626 | B1 | 4/2021 |
| JP | H11-23905 | A | 1/1999 |

OTHER PUBLICATIONS

International Search Report and Written Opinion dated Nov. 23, 2022 in corresponding International Application No. PCT/US2022/040957, 5 pages.

* cited by examiner

*Primary Examiner* — Chad H Smith
(74) *Attorney, Agent, or Firm* — MH2 TECHNOLOGY LAW GROUP LLP

(57) ABSTRACT

An optical fiber connector for achieving reduced signal transmission losses includes a ferrule basket portion configured to hold a ferrule portion and be disposed in one of a plurality of predetermined tuning positions, a carrier portion configured to engage the ferrule basket portion, and a polygonal biasing member configured to engage the ferrule basket portion and the carrier portion so as to maintain the ferrule basket portion at one of the plurality of predetermined tuning positions and mitigate against signal transmission losses between the ferrule portion and a mating ferrule when the ferrule basket portion is at the one of the plurality of predetermined tuning positions.

18 Claims, 4 Drawing Sheets

OPTICAL FIBER CONNECTOR FOR MINIMIZING SIGNAL TRANSMISSION LOSSES

CROSS-REFERENCE TO RELATED APPLICATION

This application claims the benefit of U.S. Provisional Application No. 63/234,968, filed Aug. 19, 2021, the disclosure of which is hereby incorporated by reference herein in its entirety.

BACKGROUND

The mechanical tolerances involved in terminating single mode optical fiber are much tighter than those for multimode optical fiber. Therefore, while it is quite common for multimode optical fiber be terminated at the point of use, for example, at a user's premises or at an outside junction box, in most product applications, single mode optical fiber is not terminated in the field. When single mode fiber must be terminated in the field, it can take a skilled technician between about 15 to 20 minutes to splice fibers together either by using a V-groove clamp or expensive fusion welding equipment.

Single mode fiber is therefore often provided in a range of different lengths, pre-terminated at both ends with a connector plug ready to plug into a matching receptacle. Commonly, eight or twelve single mode optical fibers may be bundled together in an optical fiber cable having an outer protective tube inside of which the optical fibers run.

An example of such a connector is the "Subscriber Connector," or SC connector, originally developed by NTT®. SC connectors have convenient push/pull style mating and are approximately square in cross-section and with a 2.5 mm diameter ferule at the termination of the optical fiber, surrounded by a plastic housing for protection. SC connectors are available in single or duplex configurations. The SC connector latches into a matching socket in a simple push motion. The push-pull design includes a spring against which the ferrule slides within a plastic inner housing. This arrangement provides a reliable contact pressure at the ferrule end and resists fiber end face contact damage of the optical fiber during connection. The connector can be quickly disconnected by disengaging a latch, before pulling the optical fiber connector from the socket. Until the latch is thus disengaged, the latch prevents withdrawal of the connector when the optical fiber cable is pulled in a direction away from the socket.

Other examples of push/pull type connectors are LC connectors or MU connectors. Often, the end face of the ferrule is angled to reduce back reflections and this is usually described by adding APC (Angled Physical Contact) to the name. All such push/pull type optical fiber connectors are for convenience referred to herein as "SC-type" optical fiber connectors. SC-type LC or MU connectors are also known as small form factor connectors, by virtue of having a 1.5 mm diameter ferrule and a plastic housing.

Signal losses within a system often occur within the connection between two optical fiber cores. For example, when the fiber is inserted into the ferrule, the core of a fiber may not and typically does not end up perfectly centered relative to the ferrule outer diameter due to manufacturing tolerances of the ferrule outer diameter to inner diameter concentricity, ferrule inner diameter hole size, fiber outer diameter, and fiber core to fiber outer diameter concentricity. If one or both of the fibers of mating connectors are off center when they are connected within an adapter, the fibers will not be aligned and thus there will be a signal loss when the signal is transmitted between the two fibers. It is therefore desirable to tune a connector to minimize this signal loss. Tuning can be accomplished by measuring signal characteristics through the connector and/or examining physical properties of the connector and then determining the optimal position of the ferrule and fiber in the connector.

It may be desirable to provide an optical fiber connector having a tuned ferrule that can float when the ferrule engages with a mating ferrule in order to minizmize transmission losses.

SUMMARY

In accordance with an exemplary embodiment of the disclosure, an optical fiber connector for achieving reduced signal transmission losses between mating ferrules includes an outer housing; an inner housing configured to be disposed within the outer housing; a boot configured to be affixed to a rearward portion of the outer housing; and a connector subassembly configured to be disposed within the inner housing. The connector assembly includes a ferrule assembly having a ferrule and a ferrule basket configured to hold the ferrule, a carrier having a front sleeve and a rear sleeve configured to be rotationally fixed to the front sleeve, and a biasing member configured to be disposed between the ferrule basket and the carrier, rotationally fixed with the ferrule assembly, and rotationally fixed with the carrier. The carrier is configured to be rotationally fixed relative to the inner housing and the outer housing. The biasing member includes a rear portion configured to be received in an engagement structure defined by the rear sleeve and a front portion configured to be received on an engagement portion of the ferrule basket, and the biasing member is configured to bias the ferrule assembly toward a front abutment surface of the carrier along a connector axis. The engagement structure is configured to define a plurality of predetermined rotational positions for tuning the connector, and the biasing member is disposed at one of the plurality of predetermined positions relative to the carrier. The engagement structure comprises a hexagonal bore, the biasing member comprises a hexagonal spring, and the engagement portion comprises a hexagonal outer surface of a stem portion of the ferrule basket, and the plurality of rotational positions comprises six rotational positions. The one of the plurality of predetermined positions comprises an position selected to tune the connector by optimizing a position of the ferrule and a fiber terminated by the ferrule relative to the carrier to minimize signal loss when the ferrule abuts a mating ferrule. The biasing member is configured to maintain the ferrule in the optimized position and to prevent rotation of the ferrule relative to the carrier, the inner housing, and the outer housing; and the biasing member is configured to permit the ferrule assembly to float relative to the carrier to optimize alignment of the ferrule relative to the mating ferrule when the ferrule abuts the mating ferrule so as to minimize signal transmission losses between the ferrule and the mating ferrule.

In some aspects of the foregoing embodiment, the biasing member is configured to be press fit into the engagement structure and onto the stem portion.

According to various aspects of the foregoing embodiments, each side of the front portion of the hexagonal spring is configured to be adjacent to a corresponding side of the hexagonal stem portion.

In various aspects of the foregoing embodiments, a front region of the rear sleeve is configured to be press fit within a rear region of the front sleeve, and the front region defines the hexagonal bore.

According to some aspects of the foregoing embodiments, a rear end of the biasing member is configured to abut a forward facing surface of a flange defined by the hexagonal bore, and a front end of the hexagonal spring is configured to abut a rearward facing surface of the ferrule basket.

In accordance with an exemplary embodiment of the disclosure, an optical fiber connector subassembly for reducing signal transmission losses in an optical fiber connector includes a ferrule assembly having a ferrule and a ferrule basket configured to hold the ferrule, a carrier having a front sleeve and a rear sleeve configured to be rotationally fixed to the front sleeve, and a polygonal biasing member configured to be disposed between the ferrule basket and the carrier, rotationally fixed with the ferrule assembly, and rotationally fixed with the carrier. The carrier is configured to be rotationally fixed relative to the inner housing and the outer housing. The polygonal biasing member includes a rear portion configured to be received in an engagement structure defined by the rear sleeve and a front portion configured to be received on a an engagement portion of the ferrule basket, and the polygonal biasing member is configured to bias the ferrule assembly toward a front abutment surface of the carrier along a connector axis. The engagement structure is configured to define a plurality of predetermined rotational positions for tuning the connector, the polygonal biasing member is disposed at one of the plurality of predetermined positions relative to the carrier, and the one of the plurality of predetermined positions comprises an position selected to tune the connector by optimizing a position of the ferrule and a fiber terminated by the ferrule relative to the carrier to minimize signal loss when the ferrule abuts a mating ferrule. The polygonal biasing member is configured to maintain the ferrule in the optimized position and to prevent rotation of the ferrule relative to the carrier, and the polygonal biasing member is configured to permit the ferrule assembly to float relative to the carrier to optimize alignment of the ferrule relative to the mating ferrule when the ferrule abuts the mating ferrule so as to minimize signal transmission losses between the ferrule and the mating ferrule.

In some aspects of the foregoing embodiment, the polygonal biasing member comprises a polygonal spring.

According to some aspects of the foregoing embodiments, polygonal biasing member is configured to be press fit into the engagement structure and onto the stem portion.

In various aspects of the foregoing embodiments, the engagement structure comprises a polygonal bore, the polygonal biasing member comprises a polygonal spring, and the engagement portion comprises a polygonal outer surface of a stem portion of the ferrule basket. In some aspects, each side of the front portion of the polygonal spring is configured to be adjacent to a corresponding side of the polygonal outer surface of the stem portion.

According to various aspects of the foregoing embodiments, a front region of the rear sleeve is configured to be press fit within a rear region of the front sleeve, and the front region defines the engagement portion.

In some aspects of the foregoing embodiments, a rear end of the polygonal biasing member is configured to abut a forward facing surface of a flange of the rear sleeve, and a front end of the polygonal biasing member is configured to abut a rearward facing surface of the ferrule basket.

In accordance with an exemplary embodiment of the disclosure, an optical fiber connector for achieving reduced signal transmission losses includes the optical fiber connector subassembly of one of the foregoing embodiments, an outer housing, and an inner housing configured to be disposed within the outer housing. The carrier of the optical fiber connector subassembly is configured to be rotationally fixed relative to the inner housing and the outer housing, and the biasing member is configured to maintain the ferrule in the optimized position and to prevent rotation of the ferrule relative to the carrier, the inner housing, and the outer housing.

In accordance with an exemplary embodiment of the disclosure, an optical fiber connector subassembly for reducing signal transmission losses in an optical fiber connector includes a ferrule assembly having a ferrule and a ferrule basket configured to hold the ferrule, a carrier configured to hold the ferrule basket, and a polygonal biasing member configured to be disposed between the ferrule basket and the carrier. The polygonal biasing member is configured to bias the ferrule assembly towards a front portion of the carrier, the ferrule is configured to be disposed at a selected one of a plurality of predetermined tuning positions relative to the carrier, and the polygonal biasing member is configured to maintain the ferrule at the selected one of the plurality of predetermined tuning positions so as to optimize alignment of the ferrule with a mating ferrule when the ferrule abuts the mating ferrule and mitigate against signal transmission losses between the ferrule and the mating ferrule when the ferrule assembly is at the selected one of the plurality of predetermined tuning positions.

In some aspects of the foregoing embodiments, the plurality of predetermined tuning positions comprises six predetermined tuning positions.

In some aspects of the foregoing embodiments, the polygonal biasing member comprises a spring.

In some aspects of the foregoing embodiments, the polygonal biasing member comprises a polygonal spring.

In some aspects of the foregoing embodiments, the polygonal biasing member is configured to bias the ferrule basket towards a front abutment surface of the carrier along a connector axis.

In accordance with an exemplary embodiment of the disclosure, an optical fiber connector for achieving reduced signal transmission losses includes the optical fiber connector subassembly of one of the foregoing embodiments, an outer housing, and an inner housing configured to be disposed within the outer housing. The carrier of the optical fiber connector subassembly is configured to be rotationally fixed relative to the inner housing and the outer housing, and the biasing member is configured to maintain the ferrule in the optimized position and to prevent rotation of the ferrule relative to the carrier, the inner housing, and the outer housing.

In accordance with an exemplary embodiment of the disclosure, and optical fiber connector for achieving reduced signal transmission losses includes a ferrule basket portion configured to hold a ferrule portion and be disposed in one of a plurality of predetermined tuning positions, a carrier portion configured to engage the ferrule basket portion, and a polygonal biasing member configured to engage the ferrule basket portion and the carrier portion so as to maintain the ferrule basket portion at one of the plurality of predetermined tuning positions and mitigate against signal transmission losses between the ferrule portion and a mating ferrule when the ferrule basket portion is at the one of the plurality of predetermined tuning positions.

In some aspects of the foregoing embodiments, the ferrule basket portion comprises a ferrule assembly having a ferrule and a ferrule basket configured to hold the ferrule.

In some aspects of the foregoing embodiments, the carrier portion comprises a carrier configured to hold the ferrule basket.

In some aspects of the foregoing embodiments, the polygonal biasing member comprises a polygonal spring configured to be disposed between the ferrule basket and the carrier.

In some aspects of the foregoing embodiments, the polygonal biasing member is configured to bias the ferrule basket portion towards a front abutment surface of the carrier portion along a connector axis.

In some aspects of the foregoing embodiments, the ferrule basket portion is configured to be disposed at a selected one of six predetermined tuning positions relative to the carrier.

In some aspects of the foregoing embodiments, the ferrule basket portion is configured to rotate relative to the carrier within a circumferential range.

In some aspects of the foregoing embodiments, the plurality of predetermined tuning positions comprises six predetermined tuning positions.

In some aspects of the foregoing embodiments, the polygonal biasing member comprises a polygonal spring.

BRIEF DESCRIPTION OF THE DRAWINGS

Further advantages and features of the present disclosure will become apparent from the following description and the accompanying drawings, to which reference is made. In which are shown.

DETAILED DESCRIPTION

Reference will now be made in detail to exemplary embodiments and methods of the present disclosure, which constitute the best modes of practicing the present disclosure presently known to the inventors. It is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1A:
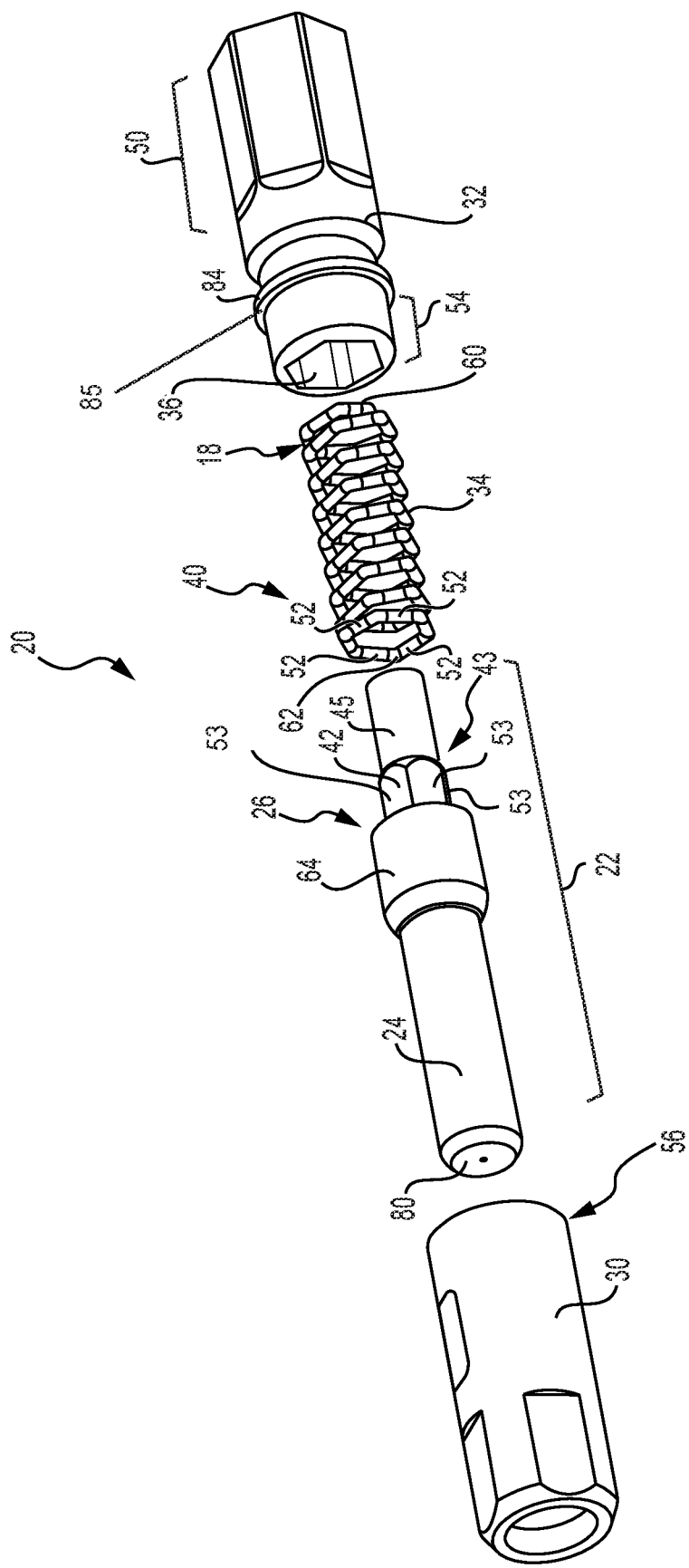
FIG. 1A is an exploded perspective view of an exemplary fiber optic connector subassembly in accordance with various aspects of the disclosure.

With reference to FIGS. 1A-3, the present disclosure describes a fiber optic connector 10 having a fiber optic connector subassembly 20 that can be tuned and also allows a ferrule 24 to "float" once the ferrule 24 is in contact with another ferrule 24' so that the connection between the mating ferrules 24 is not disrupted by an external mechanical load 72 (FIG. 3) imparted to the rear portion 18 of the connector 10. As shown in FIGS. 1A-1B, the ferrule 24 extends from the front sleeve 30 wherein the rear sleeve 32 is affixed to the front sleeve 30.

Figure 1B:
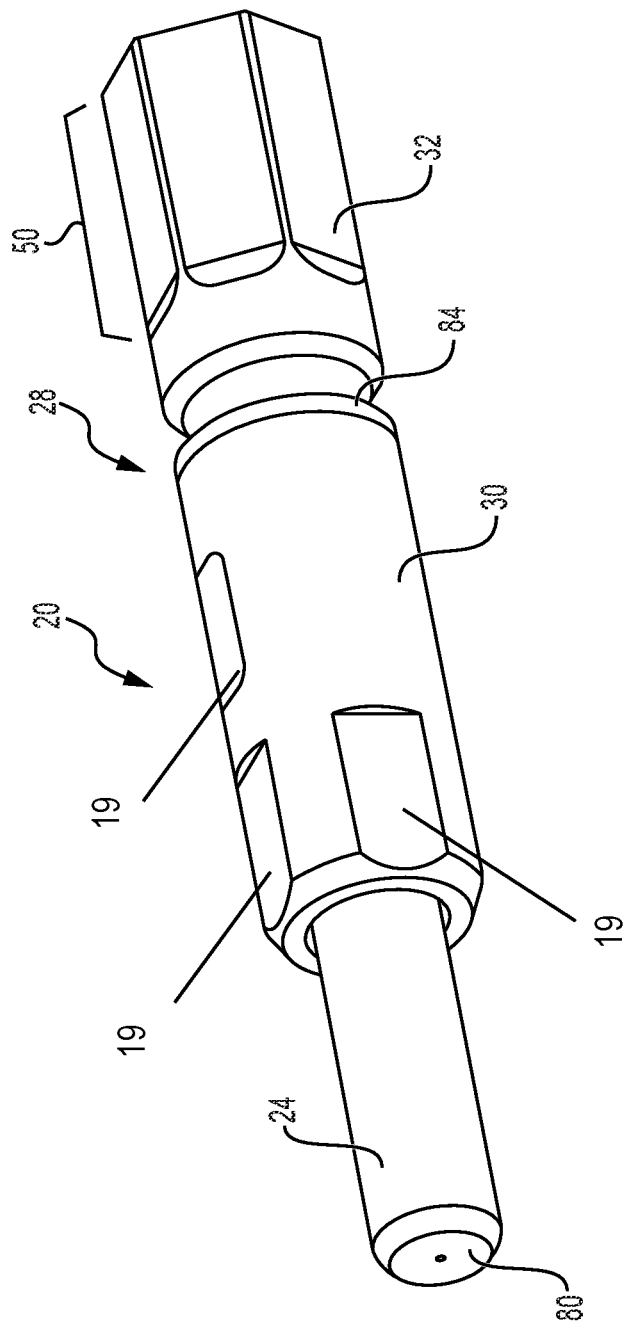
FIG. 1B is a perspective view of the fiber optic connector subassembly of FIG. 1A.
Figure 2:
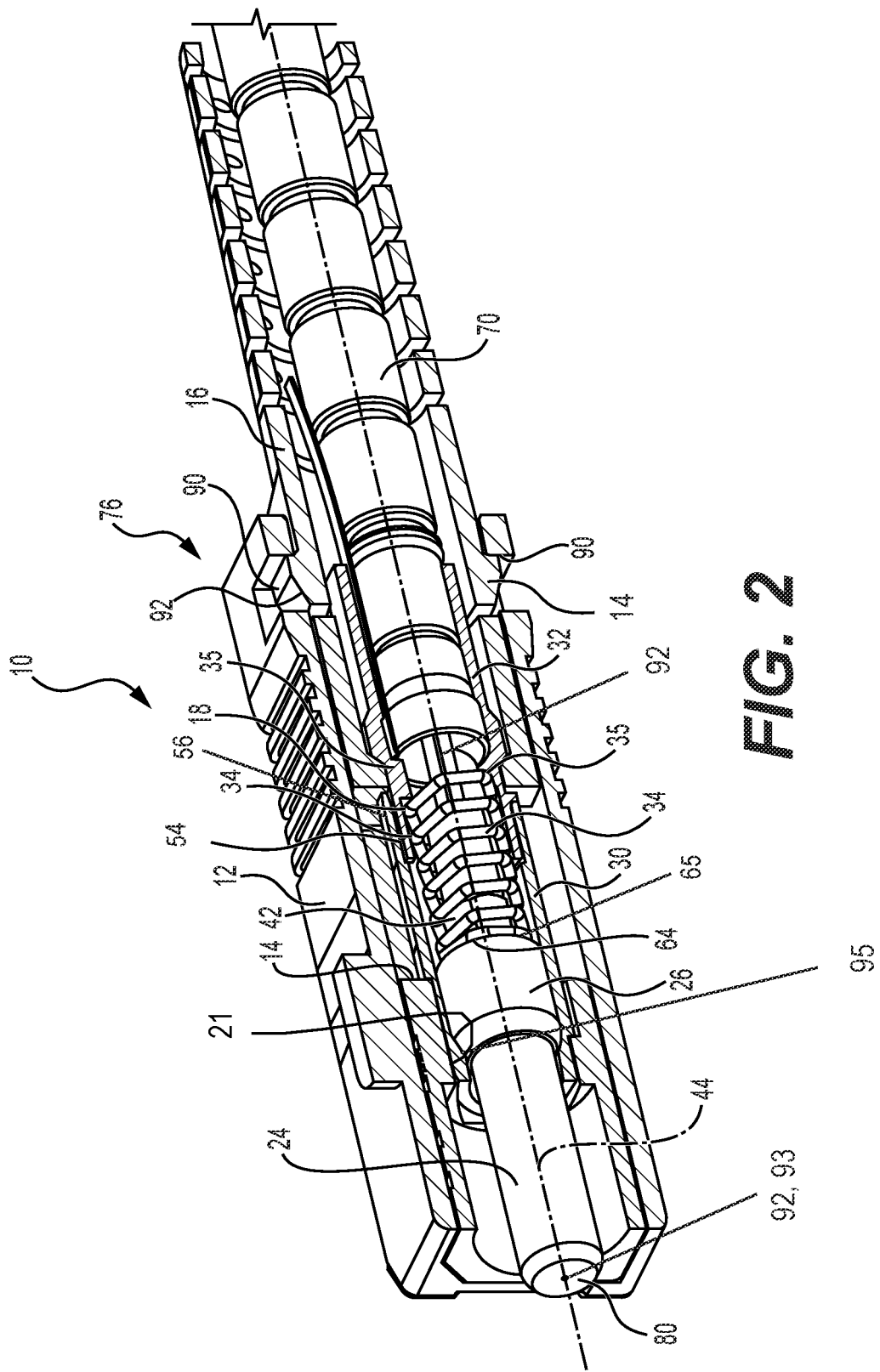
FIG. 2 is a cross-sectional perspective view of a fiber optic connector including the fiber optic connector subassembly of FIG. 1A.

As shown in FIG. 2, the optical fiber connector 10 includes an outer housing 12, an inner housing 14, a boot 16 configured to be coupled with the outer housing 12. The boot 16 may include tabs 92 configured to be disposed within apertures 90 defined by the outer housing 12, as shown in FIG. 2. As shown in FIGS. 1B and 2, the inner housing 14 is configured to be disposed within the outer housing 12, and the connector subassembly 20 is configured to be disposed within the inner housing 14. The carrier 28 of the connector subassembly 20 may be rotationally fixed within the inner housing 14 due to engagement of flat surfaces 19 (FIG. 1B) with an interior surface 21 (FIG. 2) of the inner housing 14.

Figure 3:
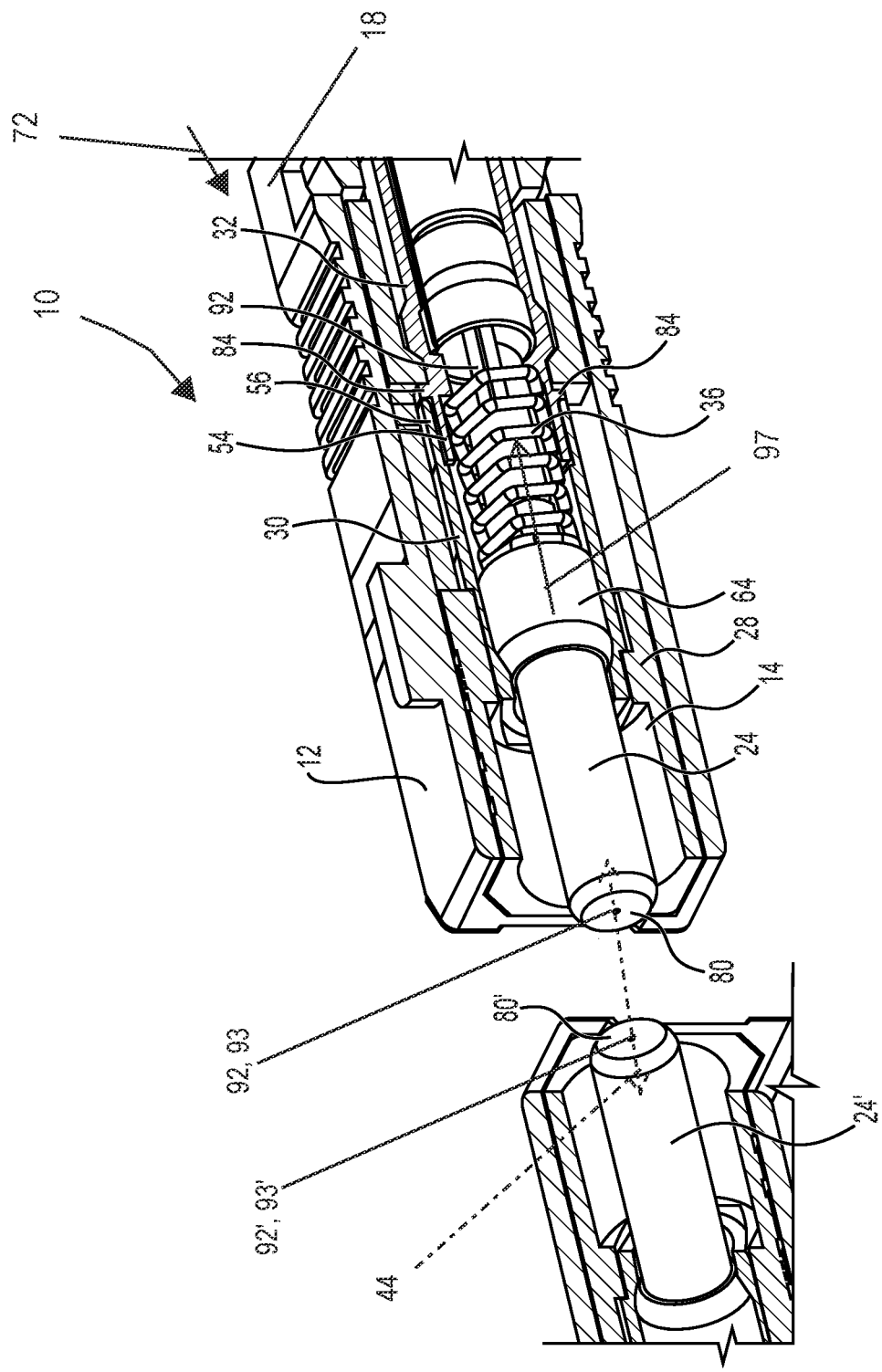
FIG. 3 is a cross-sectional perspective view of the fiber optic connector of FIG. 2 as it mates with another fiber optic connector.

As shown in FIGS. 1A, 2 and 3, the connector subassembly 20 includes a ferrule assembly 22, a carrier 28 and a polygonal biasing member 34. The number of sides of the polygonal biasing member 34 determines a number of predetermined tuning positions of the ferrule, as will be discussed below. In some aspects, the polygonal biasing member 34 may be a polygonal spring. The polygonal biasing member 34 is configured to include at least three sides. In some embodiments, the polygonal biasing member 34 may be a hexagonal biasing member such as, for example, a hexagonal spring, as illustrated. It should be appreciated that the polygonal biasing member 34 may include more than six sides to provide a correspondingly increased number of tuning positions.

The ferrule assembly 22 includes a ferrule 24 and a ferrule basket 26 configured to hold the ferrule 24. The carrier 28 may include a front sleeve 30 and a rear sleeve 32 that is configured to be rotationally fixed to the front sleeve 30. In one example, a front region 54 of the rear sleeve 32 may be received in a rear region 56 of the front sleeve 30 as shown in FIG. 3, for example, by a press fit. Also as shown in FIG. 3, the rear sleeve 32 may include a radially outward extension 84 that defines a forward-facing surface 85 (FIG. 1A) configured such that the rear region 56 of the front sleeve 30 may abut the forward facing surface 85 (FIG. 1A) of the radially outward extension 84 of the rear sleeve 32. The front region 54 of the rear sleeve 32 may also define a receiving structure 36, which may comprise, for example, a hexagonal bore in some aspects. The rear sleeve 32 of the carrier 28 may also include a region (referenced as a "crimped region 50") configured to secure the cable 70 within the rear sleeve 32 member by crimping the rear sleeve 32 member to the cable 70.

As shown in FIGS. 1A and 2, the polygonal biasing member 34 is configured to be disposed between the ferrule basket 26 and the carrier 28 as described herein. The polygonal biasing member 34 includes a front end 62, a front portion 40, a rear end 60, and a rear portion 18. As shown, the rear portion 18 may be receive in the polygonal bore 36 at the front end 62 of the rear sleeve 32, for example, via a press fit. The front portion 40 of the polygonal biasing member 34 is configured to be received on an engagement portion 42 of the ferrule basket 26. For example, in some aspects, the engagement portion 42 may be configured as a polygonal stem portion of the ferrule basket 26. With respect to the polygonal biasing member 34, it is understood that each side 52 of the front portion 40 of the polygonal biasing member 34 is configured to be adjacent to a corresponding side 53 of the engagement portion 42 as shown. This engagement between the front portion 40 of the polygonal biasing member 34 and the engagement portion 42 combined with the rear portion 18 of the polygonal biasing member 34 being received in the receiving structure 36 of the carrier 28 causes the ferrule assembly 22 (i.e., ferrule basket 26 and ferrule 24) to rotatingly fixed relative to the carrier 28. The polygonal biasing member 34 is configured to bias the ferrule assembly 22 away from the rear sleeve 32 of the carrier 28 along a connector axis 44. For example, the rear end 60 of the polygonal biasing member 34 is configured to abut a forward facing surface of a flange 35 or wall of the engagement structure 36 of the rear sleeve 32, and the front end 62 of the polygonal biasing member 34 is configured to abut a rearward facing surface 65 (FIG. 2) of a ferrule holder portion 64 of the ferrule basket 26. In the illustrated example of a hexagonal biasing member, the polygonal biasing member 34 is also configured to maintain the ferrule assembly 22 at one of six predetermined tuning positions 48 relative to the carrier 28 and/or inner housing 14 in an attempt to center the ferrule along axis 44. It is understood that the polygonal biasing member 34 and ferrule assembly 22 may be rotated to any one of the six positions within the rear sleeve 32 during assembly of the connector. Each of the predetermined tuning positions defines a potential tuning orientation of the ferrule 24 relative to the carrier 28 and/or inner housing 14 about an axis 44 wherein the end face 80 of the ferrule 24 is as aligned/centered, that is, tuned, as closely as possible with respect to axis 44. A selected tuning position (or orientation) may refer to an optimized rotational position of the ferrule 24 relative to the carrier 28 and/or inner housing 14 and/or rear sleeve 32 about the connector axis 44 in an attempt to have the end 93 of the fiber 92 be aligned with the axis 44. Once the front sleeve 30 and rear sleeve 32 are fixedly coupled to one another, the polygonal biasing member 34 is configured to maintain the ferrule 24 at the selected one of the plurality of rotational positions, i.e., an optimized tuned position.

With respect to this disclosure, it is understood that optical fiber connector 10 may include an outer housing 12, an inner housing 14 disposed within the outer housing 12, a boot 16, a carrier 28, a ferrule assembly 22, and a polygonal biasing member 34 between the ferrule assembly 22 and the carrier 28. The boot 16 may be coupled to a rearward portion 76 of the outer housing 12. The carrier 28 may be disposed within the inner housing 14. The ferrule 20 is configured to be rotating fixed relative to the carrier 28 and/or the inner housing 14, as described herein. The ferrule assembly 22 may be received at least partially in the carrier 28. The ferrule assembly 22 may include a ferrule 24 and a ferrule basket 26 that is configured to hold the ferrule 24. The polygonal biasing member 34 may be provided between the ferrule basket 26 and the carrier 28. The polygonal biasing member 34 may include a rear portion 18 that is configured to be received in an engagement structure 36, such as, for example, a polygonal bore, defined by a rear sleeve 32 of the carrier 28. Similarly, the rear sleeve 32 may define an outer extension 84 such that the rear region 56 of the front sleeve 30 abuts the outer extension 84 of the rear sleeve 32. (See FIG. 3). The front region 54 of the rear sleeve 32 may also define the engagement structure 36.

Moreover, the polygonal biasing member 34 may include a front portion 40 that is mounted on an engagement portion 42 of the ferrule basket 26. The polygonal biasing member 34 is configured to bias the ferrule assembly 22 against a front abutment surface of the carrier 28 along a connector axis 44. The polygonal biasing member 34 is also configured to maintain the ferrule assembly 22 at one of multiple predetermined tuning positions 48. Each of the predetermined tuning positions defines a potential orientation or circumferential position of the ferrule 24 relative to the carrier 28 and/or inner housing 14 about axis 44 wherein the end face 80 of the ferrule 24 is as closely aligned/centered as possible with respect to axis 44 (i.e., a selected or tuned position or orientation).

With respect to the present disclosure, it is understood that in some aspects, the polygonal biasing member 34, the engagement portion 42', and the engagement structure 36 (e.g., bore or opening) may, but not necessarily, each define a plurality of sides 52 thereby providing a user with a corresponding plurality of possible positions in which to tune the ferrule 24 (or position the ferrule 24 to the center most position). Similar to the earlier exemplary embodiments, the front region 54 of the rear sleeve 32 may be received in a rear region 56 of the front sleeve 30, for example, via a press fit connection, wherein the front region 54 defines the engagement structure 36. As indicated, the polygonal biasing member 34 may include a rear portion 18 that is received in, for example, press fit in, a polygonal bore 36 and the rear end 60 of the polygonal biasing member 34 may abut a flange 35 (or wall) defined by the engagement structure bore 36. The front end 62 of the polygonal biasing member 34 may be configured to abut a ferrule holder portion 64 of the ferrule basket 26. Each side 52 of the front portion 40 of the polygonal biasing member 34 may be adjacent to a corresponding side 53 of the engagement portion 42'.

With respect to this disclosure, it is understood that an optical fiber connector subassembly 20 may be provided wherein the subassembly includes a ferrule assembly 22, a carrier 28, and a polygonal biasing member 34 wherein a ferrule of the ferrule assembly is configured to be rotating fixed relative to the carrier 28 and/or the inner housing 14. The ferrule assembly 22 includes a ferrule 24 and a ferrule basket 26 configured to hold the ferrule 24. The carrier 28 may be configured to hold the ferrule basket 26. The polygonal biasing member 34 may be provided between the ferrule basket 26 and the carrier 28. The polygonal biasing member 34 may be configured to bias the ferrule assembly 22 against a front abutment surface 95 (see FIG. 2) of the carrier 28 along a connector axis 44, and the polygonal biasing member 34 may also be configured to maintain the ferrule assembly 22 at a selected one of a plurality of predetermined tuning positions. Each of the predetermined tuning positions defines a possible orientation of the ferrule 24 relative to the carrier 28 and/or inner housing 14 about axis 44 wherein the end face 80 of the ferrule 24 is as closely aligned/centered as possible (i.e., tuned) with respect to axis 44.

The carrier may include a rear sleeve 32 and a front sleeve 30 that are rotatingly fixed to one another, for example, via a press-fit engagement, as shown in FIG. 2. The front portion 40 of the polygonal biasing member 34 may be coupled with a polygonal engagement portion 42' of the ferrule basket 26, and a rear portion 18 of the polygonal biasing member 34 may be disposed at least partially by a polygonal engagement structure 36 (e.g., bore) of the rear sleeve 32. In some aspects, the polygonal biasing member 34, the polygonal engagement portion 42', and the polygonal engagement structure 36 may, but not necessarily, each define six sides 52. The polygonal biasing member 34, the polygonal engagement portion 42', and the polygonal engagement structure 36 may also each have more than six sides or less than six sides. It is understood that, in some exemplary aspects, the rear portion 18 of the polygonal biasing member 34 may be press fit in the polygonal engagement structure 36 of the rear sleeve 32. Similarly, in this embodiment, the rear sleeve 32 may define an outer extension 84 such that the rear region 56 of the front sleeve 30 is configured to abut the outer extension 84 of the rear sleeve 32. (See FIG. 3). The front region 54 of the rear sleeve 32 may also define the polygonal engagement structure 36. Furthermore, each side 52 of the front portion 40 of the polygonal biasing member 34 may be adjacent to a corresponding side 53 of the polygonal engagement portion 42'. The rear end 60 of the polygonal biasing member 34 may abut a flange 35 (or wall) defined by the polygonal bore 36, and the front end 62 of the polygonal biasing member 34 may abut a ferrule holder portion 64 of the ferrule basket 26.

In the various embodiments of the present disclosure, the connector 10 may be, for example, an SC connector. Moreover, the projecting end of the ferrule 24 may be optionally protected by a disposable end cap (not shown). The cable 70 implemented in the various embodiments may, but not necessarily, be a single strand of 125 μm diameter single mode optical fiber, protected by primary and secondary buffering layers 10, about 900 μm in diameter and an outer sheath, typically 3 mm to 5 mm in diameter. The optical fiber 92 may be terminated by the ferrule 24 and defines a ferrule axis 44 that extends centrally through the SC connector 10.

It is also understood that, in the various embodiments of the present disclosure, the ferrule holder includes an engagement portion 43 and a ferrule holder portion 64. The engagement portion 43 may comprise a polygonal stem portion 42 and optionally a non-polygonal stem portion 45.

The connector 10 can be "tuned" by rotating the ferrule 24 and biasing member 34 relative to the rear sleeve 32 until an optimum one position of the plurality of predetermined rotational positions is determined. The optimum tuned position is then selected by coupling the biasing member 34 with the rear sleeve 32, for example, by press fitting the rear portion of the biasing member 34 in the engagement structure. In the tuned or optimum rotational/circumferential orientation, the ferrule 24, ferrule basket 26, and biasing member 34 are arranged relative to the rear sleeve 32 and the front sleeve 30 such that the end face 80 of the ferrule (and the end of the fiber 92) is aligned as close as possible to the center axis 44 (FIG. 2). (See FIG. 3) Connectors 10, 10' are tuned to so that when two connectors 10, 10' are coupled together via an adapter, the mating ends 93, 93' of the fibers 92, 92' (and the associated mating ferrules 24, 24') being connected are centered (i.e., aligned) relative to one another. Poor alignment between fibers 92 can result in high insertion and return losses. Insertion loss is the measurement of the amount of power that is transferred through a coupling from an input fiber 92 to an output fiber 92'. Return loss is the measurement of the amount of power that is reflected back into the input fiber 92. It should be appreciated that, in aspects where the biasing member 34, engagement portion, and engagement structure 36 each define six faces or sides 52, there are six rotational positions which are available for optimizing the tuning of the connector 10 assembly (e.g., to align the end of an input optical fiber 92 or ferrule 24 relative to axis 44). However, it is also understood that the polygonal biasing member 34, engagement portion region, and engagement strucure may each define three, four, five, seven, eight, or more sides 52.

It is also understood that, with respect to the various example embodiments, the first end of the polygonal biasing member 34 may be fitted over the engagement portion of the ferrule basket 26, and the second end of the polygonal biasing member 34 may be received within the engagement structure 36 (e.g., via a press fit) of the rear crimp tube so that the polygonal biasing member 34 and the ferrule assembly 22 rotatingly fixed relative to each other. As shown in FIG. 3, the polygonal biasing member 34 may be a biasing member that is configured to urge the ferrule basket 26 against the abutment surface 95 of the front sleeve 30 when an external load (such as a load from an abutting mating ferrule 24') is not applied to the ferrule 24. Therefore, according to the present disclosure, the chosen rotational position of the ferrule 24 may be maintained so as to provide a "tuned" (or centered along axis 44) ferrule 24 and optical fiber 92 without sacrificing the ability of the ferrule 24 and ferrule basket 26 to float when the ferrule 24 is engaged with a mating ferrule 24'.

The arrangement of the carrier 28, the polygonal biasing member 34, and ferrule assembly 22 enables the ferrule assembly 22 to float wherein the angled end face 80 of the ferrule 24 and the angled end face 80' of the mating ferrule 24' has the flexibility to move together when a load 72 is applied to the rear portion 18 of the connector 10. As a result of the maintained connection between each end face 80, 80', the risk of disruption to a signal between the ferrules 24, 24' is significantly reduced. The ferrule assembly 22 may also freely move backwards when an end face 80 of the ferrule 24 comes into contact with a similar end face 80' (FIG. 3) of another optical fiber ferrule 24' when making an optical connection given that the polygonal biasing member 34 may be compressed as the ferrule assembly 22 moves backwards 97 (see FIG. 3) into the connector 10 upon contact with a mating ferrule 24'. Thus, when the ferrule assembly 22 moves backwards 97 along axis 44, the ferrule basket 26 may no longer contact the abutment surface 95 of the front sleeve 30 as described above. The carrier 28, the polygonal biasing member 34, and the ferrule assembly 22 enable the ferrule 24 and ferrule basket 26 to float together conically (e.g., angularly from side-to-side and/or up-and-down) relative to a horizontal axis 44 when a mechanical load 72 is applied to the rear portion 18 of the connector 10 such that the angled end faces 80, 80' remain in alignment. (See example mechanical load 72 in FIG. 3.) As a result, contact between the end faces 80, 80' of the mating ferrules 24, 24' is maintained and the signal is not subject to unnecessary degradation at the connection point between the ferrules 24, 24'. The polygonal biasing member 34 biases/returns the ferrule 24 and the ferrule basket 26 to its original center position (tuned position) when the load (from the mating ferrule 24) is removed. This floating feature isolates the ferrule 24 of the optical fiber cable 70 and the ferrule basket 26 from external loads applied to the connector via the fiber optic cable 70.

The polygonal biasing member 34 allows the ferrule assembly 22 (ferrule 24 and ferrule basket 26) to float angularly relative to the axis 44 of the fiber 92. Consequently, when a mechanical load 72 is placed on the cable 70 that results in an angular moment being placed on the ferrule 24, the ferrule 24 and the ferrule basket 26 may rotate or articulate relative to the polygonal biasing member 34 and the rear sleeve 32 in order to maintain contact with the mating ferrule 24. Once the angular moment no longer exists, the engagement between the polygonal biasing member 34 and the ferrule basket 26 as well as the rear crimp tube allows the ferrule 24 to return to its original center (tuned) position (predetermined position). Therefore, under the thrust of the biasing member 34, the connector 10 assembly 10 may ensure that the two optical fiber ends 93, 93' are in contact. Thus, this floating assembly may ensure constant contact of two optical fiber ends 93, 93'. (See FIG. 3).

The cable adapter (not shown) may be mounted to float. The polygonal biasing member 34 in the carrier 28 helps to maintain a thrust on the ferrule assembly 22 thereby ensuring a permanent contact at the junction of the two ferrules 24, 24' (optical fiber ends). The polygonal biasing member 34 is specially engineered to ensure this junction both in case of expansion and contraction of the two fiber portions.

Therefore, it is understood that an optical fiber connector 10 for achieving reduced signal transmission losses according to the present disclosure may include a ferrule basket portion 22, a carrier portion 28, and a polygonal biasing member 34. The ferrule basket portion 22 may be configured to hold a ferrule portion 24 and be disposed in one of a selected plurality of predetermined tuning positions. The carrier portion 28 may be configured to engage the ferrule basket portion 22. The polygonal biasing member 34 may be configured to engage the ferrule basket portion 22 and the carrier portion 28 so as to maintain the ferrule basket portion 22 at a selected one of the plurality of predetermined tuned positions and mitigate against signal transmission losses between the ferrule portion 24 and a mating ferrule portion 24' when the ferrule basket portion 22 is maintained at the selected one of the plurality of predetermined tuned positions. The ferrule basket portion 22 may be a ferrule assembly 22 that includes the ferrule 24 and a ferrule basket 64 that is configured to hold the ferrule portion 24. The carrier portion 28 may be a carrier 28 configured to hold the ferrule basket 64 wherein the carrier 28 includes a front sleeve 30 and a rear sleeve 32. The polygonal biasing member 34 may be a polygonal spring 34 configured to be disposed between the ferrule basket 64 and the carrier 28.

The polygonal biasing member 34 may be configured to bias the ferrule basket portion 64 towards front portion (or a front abutment surface) 95 of the carrier portion 28 along a connector axis 44. The ferrule basket portion 64 may be configured to be disposed at a selected one of six predetermined tuning positions relative to the carrier portion 28. The ferrule basket portion 64 may be rotating fixed relative to the carrier portion 28 and/or the inner housing 14. The plurality of predetermined tuning position may comprise six predetermined tuning positions. With respect to the various embodiments of the present disclosure, it is understood that the polygonal biasing member 34 may be a polygonal spring 34.

Similarly, each of the predetermined tuning positions for this exemplary fiber optic connector 10 defines a possible orientation of the ferrule portion's position within the carrier portion 28 about an axis 44 wherein an end face 80 of the ferrule portion 24 is as closely aligned/centered as possible with respect to axis 44. The preferred orientation refers to the ferrule portion's rotational position relative to the carrier portion 28 and/or inner housing 14 and/or rear sleeve 32 about the connector axis 44 in an attempt to have the end 93 of the fiber 92 be aligned with the axis 44.

While multiple example, non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An optical fiber connector for achieving reduced signal transmission losses between mating ferrules comprising:
   an outer housing;
   an inner housing configured to be disposed within the outer housing;
   a boot configured to be affixed to a rearward portion of the outer housing;
   a connector subassembly configured to be disposed within the inner housing and including:
      a ferrule assembly having a ferrule and a ferrule basket configured to hold the ferrule,
      a carrier having a front sleeve and a rear sleeve configured to be rotationally fixed to the front sleeve,
      a biasing member configured to be disposed between the ferrule basket and the carrier, rotationally fixed with the ferrule assembly, and rotationally fixed with the carrier, and
      wherein the carrier is configured to be rotationally fixed relative to the inner housing and the outer housing;
   wherein the biasing member includes a rear portion configured to be received in an engagement structure defined by the rear sleeve and a front portion configured to be received on an engagement portion of the ferrule basket;
   wherein the biasing member is configured to bias the ferrule assembly toward a front abutment surface of the carrier along a connector axis;
   wherein the engagement structure is configured to define a plurality of predetermined rotational positions for tuning the connector;
   wherein the biasing member is disposed at one of the plurality of predetermined positions relative to the carrier;
   wherein the engagement structure comprises a hexagonal bore, the biasing member comprises a hexagonal spring, and the engagement portion comprises a hexagonal outer surface of a stem portion of the ferrule basket;
   wherein the plurality of rotational positions comprises six rotational positions;
   wherein the one of the plurality of predetermined positions comprises a position selected to tune the connector by optimizing a position of the ferrule and a fiber terminated by the ferrule relative to the carrier to minimize signal loss when the ferrule abuts a mating ferrule;
   wherein the biasing member is configured to maintain the ferrule in the optimized position and to prevent rotation of the ferrule relative to the carrier, the inner housing, and the outer housing; and
   wherein the biasing member is configured to permit the ferrule assembly to float relative to the carrier to optimize alignment of the ferrule relative to the mating ferrule when the ferrule abuts the mating ferrule so as to minimize signal transmission losses between the ferrule and the mating ferrule.

2. The optical fiber connector of claim 1, wherein the biasing member is configured to be press fit into the engagement structure and onto the stem portion.

3. The optical fiber connector of claim 1, wherein each side of the front portion of the hexagonal spring is configured to be adjacent to a corresponding side of the hexagonal stem portion.

4. The optical fiber connector of claim 1, wherein a front region of the rear sleeve is configured to be press fit within a rear region of the front sleeve, and the front region defines the hexagonal bore.

5. The optical fiber connector of claim 1, wherein a rear end of the biasing member is configured to abut a forward facing surface of a flange defined by the hexagonal bore, and wherein a front end of the hexagonal spring is configured to abut a rearward facing surface of the ferrule basket.

6. An optical fiber connector subassembly for reducing signal transmission losses in an optical fiber connector comprising:
- a ferrule assembly having a ferrule and a ferrule basket configured to hold the ferrule;
- a carrier having a front sleeve and a rear sleeve configured to be rotationally fixed to the front sleeve;
- a polygonal biasing member configured to be disposed between the ferrule basket and the carrier, rotationally fixed with the ferrule assembly, and rotationally fixed with the carrier;
- wherein the carrier is configured to be rotationally fixed relative to the front sleeve and the rear sleeve;
- wherein the polygonal biasing member includes a rear portion configured to be received in an engagement structure defined by the rear sleeve and a front portion configured to be received on an engagement portion of the ferrule basket;
- wherein the polygonal biasing member is configured to bias the ferrule assembly toward a front abutment surface of the carrier along a connector axis;
- wherein the engagement structure is configured to define a plurality of predetermined rotational positions for tuning the connector;
- wherein the polygonal biasing member is disposed at one of the plurality of predetermined positions relative to the carrier;
- wherein the one of the plurality of predetermined positions comprises a position selected to tune the connector by optimizing a position of the ferrule and a fiber terminated by the ferrule relative to the carrier to minimize signal loss when the ferrule abuts a mating ferrule;
- wherein the polygonal biasing member is configured to maintain the ferrule in the optimized position and to prevent rotation of the ferrule relative to the carrier; and
- wherein the polygonal biasing member is configured to permit the ferrule assembly to float relative to the carrier to optimize alignment of the ferrule relative to the mating ferrule when the ferrule abuts the mating ferrule so as to minimize signal transmission losses between the ferrule and the mating ferrule.

7. The optical fiber connector subassembly of claim 6, wherein the polygonal biasing member comprises a polygonal spring.

8. The optical fiber connector subassembly of claim 6, wherein polygonal biasing member is configured to be press fit into the engagement structure and onto the stem portion.

9. The optical fiber connector subassembly of claim 6, wherein the engagement structure comprises a polygonal bore, the polygonal biasing member comprises a polygonal spring, and the engagement portion comprises a polygonal outer surface of a stem portion of the ferrule basket.

10. The optical fiber connector subassembly of claim 9, wherein each side of the front portion of the polygonal spring is configured to be adjacent to a corresponding side of the polygonal outer surface of the stem portion.

11. The optical fiber connector subassembly of claim 6, wherein a front region of the rear sleeve is configured to be press fit within a rear region of the front sleeve, and the front region defines the engagement portion.

12. The optical fiber connector subassembly of claim 6, wherein a rear end of the polygonal biasing member is configured to abut a forward facing surface of a flange of the rear sleeve, and wherein a front end of the polygonal biasing member is configured to abut a rearward facing surface of the ferrule basket.

13. An optical fiber connector for achieving reduced signal transmission losses comprising:
- the optical fiber connector subassembly of claim 6;
- an outer housing;
- an inner housing configured to be disposed within the outer housing;
- wherein the carrier of the optical fiber connector subassembly is configured to be rotationally fixed relative to the inner housing and the outer housing; and
- wherein the biasing member is configured to maintain the ferrule in the optimized position and to prevent rotation of the ferrule relative to the carrier, the inner housing, and the outer housing.

14. An optical fiber connector for achieving reduced signal transmission losses comprising:
- an optical fiber connector subassembly including:
  - a ferrule assembly having a ferrule and a ferrule basket configured to hold the ferrule;
  - a carrier configured to hold the ferrule basket;
  - polygonal biasing member configured to be disposed between the ferrule basket and the carrier;
  - wherein the polygonal biasing member extends in a longitudinal direction and is coiled around a longitudinal axis such that the biasing member comprises a plurality of linear sides that form a polygonal outer perimeter in a radial direction relative to the longitudinal axis;
  - wherein the polygonal biasing member is configured to bias the ferrule assembly towards a front portion of the carrier;
  - wherein the ferrule is configured to be disposed at a selected one of a plurality of predetermined tuning positions relative to the carrier; and
  - wherein the polygonal biasing member is configured to maintain the ferrule at the selected one of the plurality of predetermined tuning positions so as to optimize alignment of the ferrule with a mating ferrule when the ferrule abuts the mating female and mitigate against signal transmission losses between the ferrule and the mating ferrule when the ferrule assembly is at the selected one of the plurality of predetermined toning positions;
- an outer housing;
- an inner housing configured to be disposed within the outer housing;
- wherein the carrier of the optical fiber connector subassembly is configured to be rotationally fixed relative to the inner housing and the outer housing; and
- wherein the biasing member is configured to maintain the ferrule in the optimized position and to prevent rotation of the ferrule relative to the carrier, the inner housing, and the outer housing.

15. The connector of claim 14, wherein the plurality of predetermined tuning positions comprises six predetermined tuning positions.

16. The connector of claim 14, wherein the polygonal biasing member comprises a spring.

17. The connector of claim 14, wherein the polygonal biasing member comprises a polygonal spring.

18. The connector of claim 14, wherein the polygonal biasing member is configured to bias the ferrule basket towards a front abutment surface of the carrier along a connector axis.

* * * * *